(12) United States Patent
Cooper

(10) Patent No.: US 11,914,509 B1
(45) Date of Patent: Feb. 27, 2024

(54) CIRCUITRY AND METHOD

(71) Applicant: Arm Limited, Cambridge (GB)

(72) Inventor: Richard Jared Cooper, Letchworth Garden (GB)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 17/893,342

(22) Filed: Aug. 23, 2022

(51) Int. Cl.
 G06F 12/02 (2006.01)

(52) U.S. Cl.
 CPC .. *G06F 12/0292* (2013.01); *G06F 2212/7201* (2013.01)

(58) Field of Classification Search
 CPC .................. G06F 12/0292; G06F 2212/7201
 See application file for complete search history.

(56) References Cited

U.S. PATENT DOCUMENTS

| | | | | |
|---|---|---|---|---|
| 2018/0107606 A1* | 4/2018 | Williamson | ........ | G06F 12/1063 |
| 2019/0188149 A1* | 6/2019 | Abhishek Raja | ... | G06F 12/0891 |
| 2021/0109864 A1* | 4/2021 | Yuan | ................... | G06F 12/1475 |
| 2021/0157500 A1* | 5/2021 | Gu | ........................ | G06F 3/0613 |
| 2021/0165745 A1* | 6/2021 | Karve | ................. | G06F 12/1009 |
| 2022/0382682 A1* | 12/2022 | Giamei | ............... | G06F 12/1441 |
| 2023/0071555 A1* | 3/2023 | Ogawa | .................. | G06F 21/604 |

\* cited by examiner

*Primary Examiner* — Jason W Blust
(74) *Attorney, Agent, or Firm* — NIXON & VANDERHYE P.C.

(57) ABSTRACT

Circuitry comprises memory address translation circuitry to access memory circuitry storing translation information defining memory address translations from input memory addresses to respective output memory addresses; in which the translation information stored by the memory circuitry comprises a hierarchy of page table levels from a highest page table level to a lowest page table level, each page table level having one or more level tables each comprising two or more entries, in which an entry of a level table at a page table level other than a last page table level of the hierarchy points to a level table at a next lower page table level in the hierarchy; the memory address translation circuitry being configured to select an entry of a level table at each page table level according to a selection value, the selection value being dependent upon a portion, applicable to that page table level, of a given input memory address; in which the memory circuitry is configured to store entries as groups of entries, a group of entries being accessible by a single memory retrieval operation; and in which, for at least a subset of the page table levels, a group of entries stored by the memory circuitry comprises a set of entries from two or more respective level tables.

20 Claims, 11 Drawing Sheets

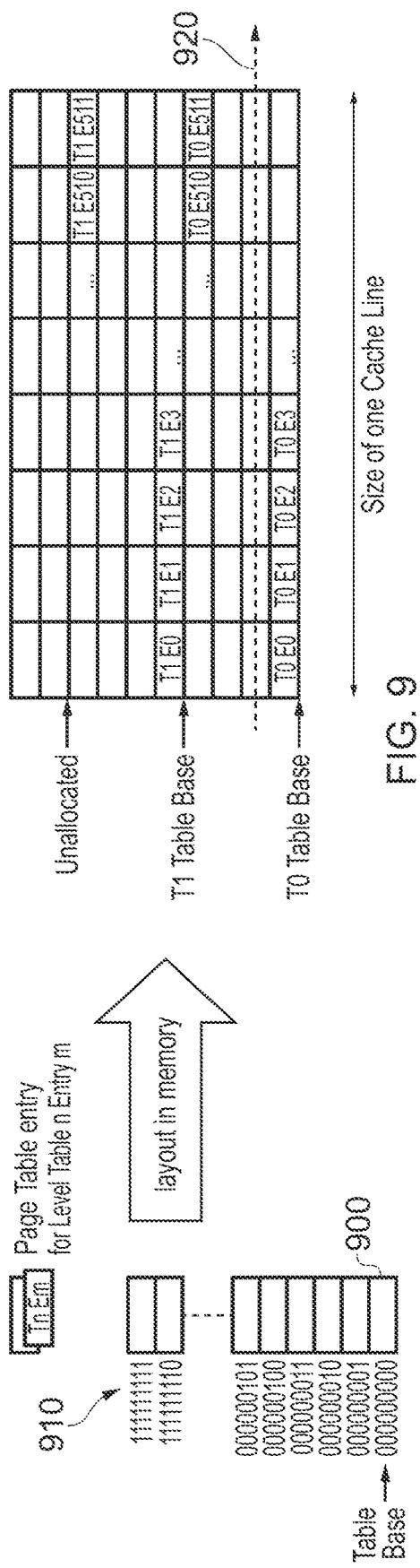
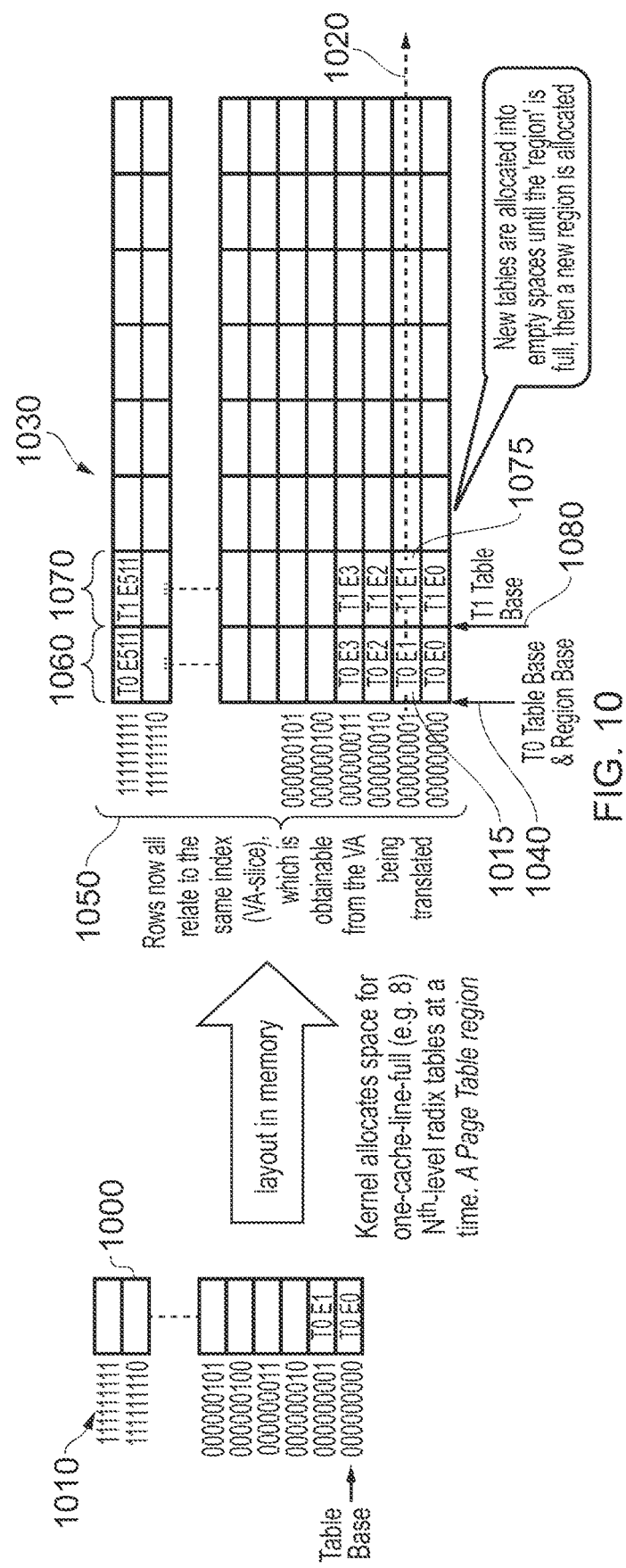
FIG. 9
FIG. 10

CIRCUITRY AND METHOD

BACKGROUND

This disclosure relates to circuitry and methods, for example in connection with memory address translation.

Memory address translation circuitry, such as memory management units (MMUs), attend to the translation of input memory addresses into output memory addresses.

A data processing apparatus typically provides each running program with access to a virtual address space defined by virtual memory addresses. Each program sees its own virtual address space which contains instructions and data for use by that program. Amongst other established advantages, the use of virtual addressing allows the operating system to control memory access by inhibiting one program from accessing or corrupting information used by another program.

When an access is required to a virtual memory address, it is first necessary to translate the virtual memory address to a physical memory address so that the required information can be obtained from or written to the physical memory or a physical memory cache. A single stage process may be used, or a multiple stage translation (for example via an intermediate physical address) may be used.

A cache sometimes known as a translation lookaside buffer (TLB) may be used as part of the address translation process. The TLB stores recently or commonly used translations between virtual and physical memory addresses. So, as a first step in an address translation process, the TLB is consulted to detect whether the TLB already contains the required address translation. If not, then a more involved translation process may be used, for example involving consulting so-called page tables holding address translation information, typically resulting in the TLB being populated with the required translation.

Consulting the page tables may involve potentially time consuming accesses to main memory.

SUMMARY

In an example arrangement there is provided circuitry comprising:
  memory address translation circuitry to access memory circuitry storing translation information defining memory address translations from input memory addresses to respective output memory addresses;
  in which the translation information stored by the memory circuitry comprises a hierarchy of page table levels from a highest page table level to a lowest page table level, each page table level having one or more level tables each comprising two or more entries, in which an entry of a level table at a page table level other than a last page table level of the hierarchy points to a level table at a next lower page table level in the hierarchy;
  the memory address translation circuitry being configured to select an entry of a level table at each page table level according to a selection value, the selection value being dependent upon a portion, applicable to that page table level, of a given input memory address;
  in which the memory circuitry is configured to store entries as groups of entries, a group of entries being accessible by a single memory retrieval operation;
  and in which, for at least a subset of the page table levels, a group of entries stored by the memory circuitry comprises a set of entries from two or more respective level tables.

In another example arrangement there is provided a method comprising:
  accessing translation information defining memory address translations from input memory addresses to respective output memory addresses;
  in which the translation information comprises a hierarchy of page table levels from a highest page table level to a lowest page table level, each page table level having one or more level tables each comprising two or more entries, in which an entry of a level table at a page table level other than a last page table level of the hierarchy points to a level table at a next lower page table level in the hierarchy;
  storing entries as groups of entries, a group of entries being accessible by a single memory retrieval operation, in which, for at least a subset of the page table levels, a group of entries stored by the memory circuitry comprises a set of entries from two or more respective level tables; and
  selecting an entry of a level table at each page table level by a selection value, the selection value being dependent upon a portion, applicable to that page table level, of a given input memory address;

Further respective aspects and features of the present technology are defined by the appended claims.

BRIEF DESCRIPTION OF THE DRAWINGS

The present technique will be described further, by way of example only, with reference to embodiments thereof as illustrated in the accompanying drawings, in which:
FIGS. 9 and 10 schematically illustrate page table storage in memory.

DESCRIPTION OF EMBODIMENTS

Figure 1:
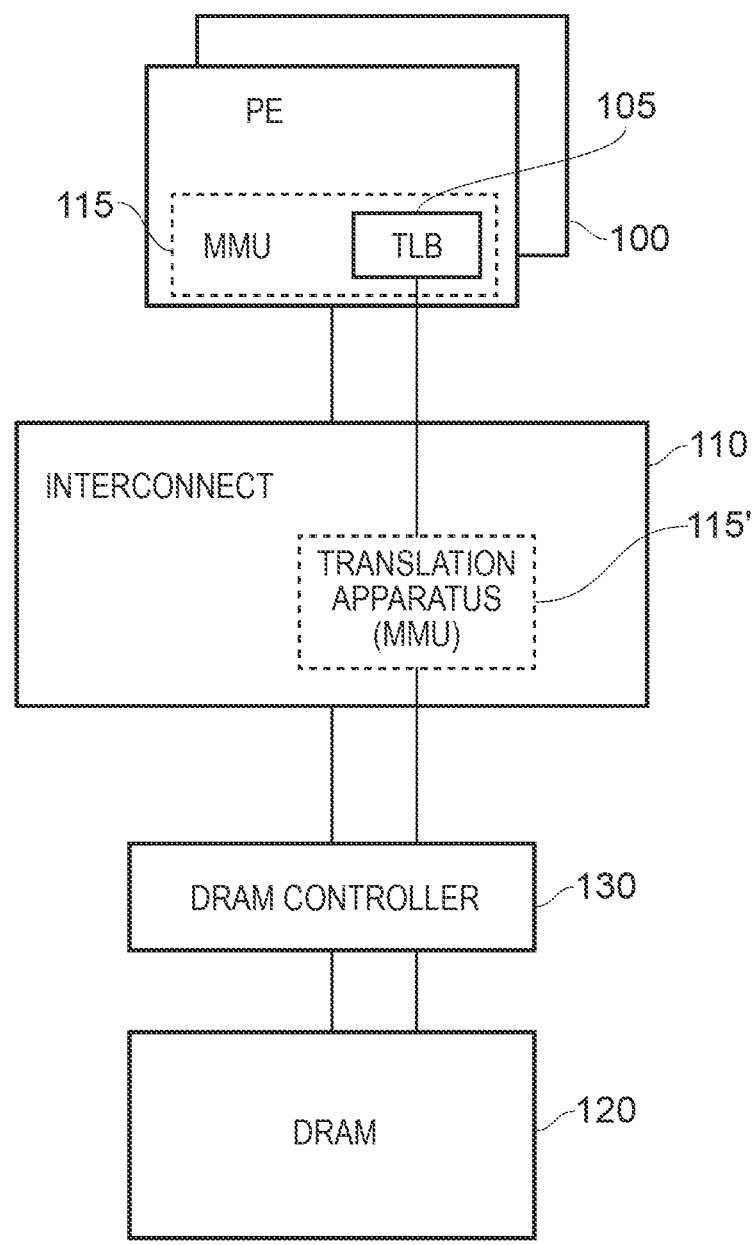
FIG. 1 is a schematic diagram of a data processing apparatus.

Referring now to the drawings, FIG. 1 schematically illustrates another example of a data processing apparatus comprising: one or more processing elements (PE) 100, an interconnect circuit 110, a dynamic random access memory (DRAM) 120 and a DRAM controller 130.

Each of the processing elements 100 can access at least some of the memory locations in the DRAM 120. In principle this access could be directly via actual (physical) memory addresses. However, in order to provide partitioning and a degree of security between memory accesses by different processes or processing elements (or in some cases different operating systems running on the processing elements 100), the processing elements 100 refer to memory addresses by so-called virtual memory addresses (VAs). These require translation into output or physical memory addresses (PAs) to access real (physical) memory locations in the DRAM 120. Such translations are handled by translation apparatus or circuitry 115 such as a so-called Memory Management Unit (MMU).

Note that in FIG. 1 the MMU 115 may be part of or be associated with a respective PE 100 or with a set or cluster of PEs. In other examples, the MMU (drawn as 115' in FIG. 1) may be implemented on a shared basis at the interconnect circuitry for example. The MMU may comprise the TLB 105 and other circuitry (discussed below with reference to FIG. 12).

The translation of VAs (as an example of input memory addresses) to PAs (as an example of output memory addresses) represents an example of a single stage memory address translation operation. For example, translation information to represent the memory address translations may be established by an operating system (OS) operating at (for example) a higher security or privilege level than software making use of the memory address translations. In other example multi-stage memory address translations may be used. An example here is a two-stage process, in which a first stage of translation, which may be under the control of an OS, provides translation between VAs and respective intermediate physical addresses (IPAs), with a second stage of translation, for example under the control of a hypervisor running at a higher security and/or privilege level than the OS, being used to translate from the IPAs to the PAs by which physical memory is actually accessed. In a multiple stage process, the input to each stage (for example VAs or IPAs) can be considered as input memory addresses and the output from each stage (for example IPAs or PAs respectively) can be considered as output memory addresses.

However, address translation or a stage of address translation can (from the point of view of a processing element 100) be performed by a translation lookaside buffer (TLB) 105 associated with that processing element. The TLB 105 stores or buffers recently-used translations between input memory addresses and output memory addresses. The particular example shown relates to a single stage translation but could instead refer to a given stage within a multi-stage translation. In operation, the processing element 100 refers a virtual memory address to the TLB 105. Assuming the translation is stored at the TLB 105, the virtual memory address is translated to a physical memory address which then forms part of a memory access to be DRAM 120. However, the TLB has limited size and cannot store every single possible memory address translation which may be called upon by the processing element 100. In the case that a required translation is not present in the TLB 105, the TLB refers the request for a more involved translation process to be performed by the MMU 115 or 115'. The translation apparatus operates to provide or otherwise obtain the required translation and pass it back for storage by the TLB 105 where it can be stored and used to translate a virtual memory address into a physical memory address.

Example Operation of TLB 105

Figure 2:
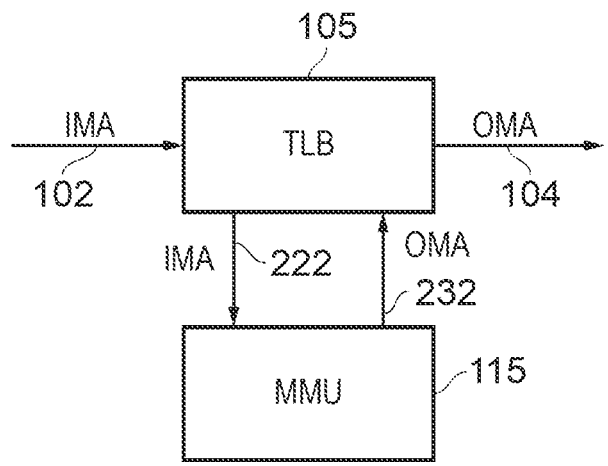
FIG. 2 is a schematic representation of the operation of a translation lookaside buffer.

FIG. 2 schematically illustrates the use of a translation lookaside buffer (TLB) 105. For the purposes of FIG. 2, other items relating to the data communication between the TLB 105 and the MMU 115 are omitted for clarity of the diagram.

Figure 3:
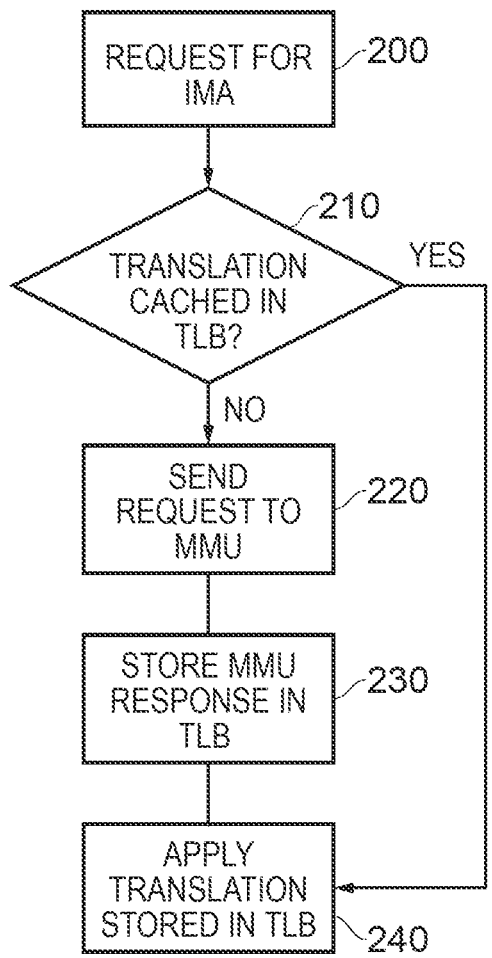
FIG. 3 is a schematic flowchart illustrating a memory address translation operation.

As part of the operation of the processing element (or other module or arrangement with which the TLB 105 is associated), the TLB 105 receives an input memory address (IMA) 102 such as a VA or IPA relating to a required memory access. This could of course be a read or a write memory access; it is immaterial to the present discussion which type of memory access is underway. Referring also to FIG. 3 (which is a schematic flowchart illustrating operations of the TLB 105), supply of an IMA 102 to the TLB 105 forms a request for a corresponding output memory address (OMA) 104 (shown in FIG. 3 as a step 200).

The TLB 105 contains a cache or store of translations between IMA and OMA. The criteria by which the TLB 105 stores particular IMA to OMA translations can be established according to known techniques for the operation of a TLB and will be discussed further below. The cached translations might include recently used translations, frequently used translations and/or translations which are expected to be required soon (such as translations relating to IMAs which are close to recently-accessed IMAs). Overall, the situation is that the TLB contains a cache of a subset of the set of all possible IMA to OMA translations, such that when a particular IMA to OMA translation is required, it may be found that the translation is already held in the cache at the TLB, or it may not.

Accordingly, at a next step 210, the TLB 105 detects whether the required translation is indeed currently cached by the TLB. If the answer is yes, then control passes to a step 240 in which the required translation is applied to the IMA 102 to generate the OMA 104. However, if the answer is no, then control passes to a step 220 at which the TLB 105 sends a request, comprising the required IMA 222, to the MMU 115. The MMU 115 derives the required IMA to OMA translation (using techniques to be discussed below) and sends at least the OMA 232 corresponding to the IMA 222 back to the TLB 105 where it is stored at a step 230.

Finally, at the step 240, the TLB 105 applies the translation stored at the TLB 105 to provide the output OMA 104.

Example Operation of MMU 115

By way of technical context and background to the present disclosure, an example of the operation of the MMU 115 to obtain a required translation of the VA 222 to the PA 232 will now be described with reference to FIGS. 4 and 5. These diagrams refer to a previously proposed arrangement of page tables, and it is noted that for at least one or more page table levels in the hierarchy to be discussed, a different arrangement of translation information (which will itself be discussed in detail below) may be used.

This description will be provided in the context of a VA to PA translation but it will be appreciated that the same techniques can be used for any IMA to OMA translation whether in a single stage system or a particular stage of a multiple stage system.

Figure 4:
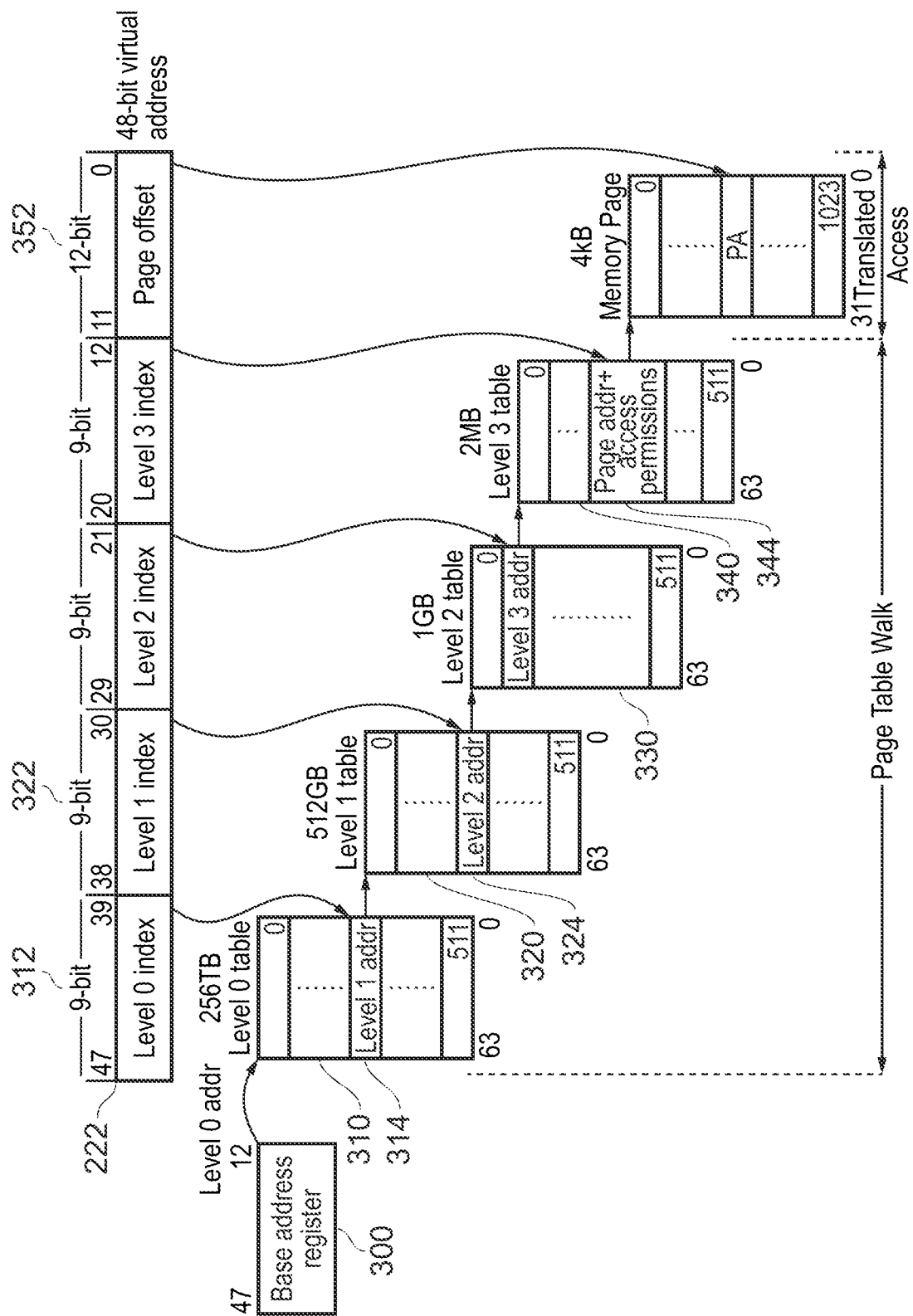
FIG. 4 schematically illustrates a page table walk.
Figure 5:
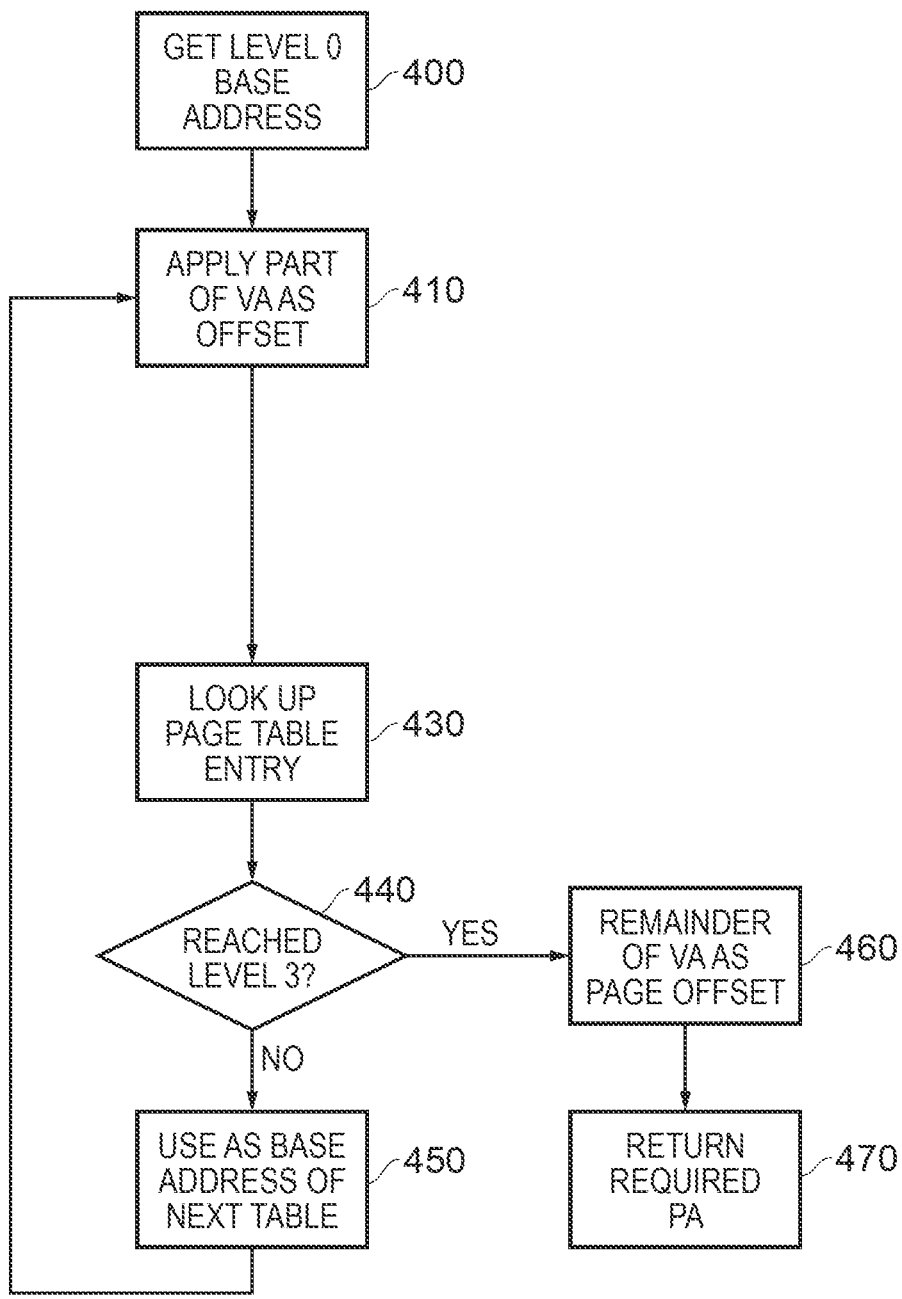
FIG. 5 is a schematic flowchart illustrating the operation of a memory management unit.

FIG. 4 schematically illustrates an example of a so-called page table walk (PTW) process, and FIG. 5 is a schematic flowchart illustrating a PTW process.

In this example, a VA 222 which requires translation is formed as a 48-bit value. However, it will be appreciated that the techniques are applicable to addresses of various lengths, and indeed that the length of a VA need not necessarily be the same as the length of a PA.

Different portions or slices of the VA 222 are used at different stages in the PTW process.

To obtain a first or highest entry in the page table hierarchy, in the "level 0 table" 310, a base address stored in a base address register 300 (FIG. 4) is obtained at a step 400 (FIG. 5). A first portion 312 of the VA 222, being the 9 most significant bits, is combined with (for example added to, as an offset) the base address, at a step 410 so as to provide an entry in the level 0 table at which there is stored a PA 314 of a level 1 table 320. The relevant page table entry is looked up in physical memory or in cache memory such as a level 2 cache (if the relevant page is cached) at a step 430.

In the present examples, page table entries (PTEs) provide physical addresses of a base address of a level table at a next page table level. It would in principle be possible for virtual addresses to be provided, but this would then require a further translation process in order to obtain the required next base address.

At a step 440, a detection is made as to whether a final or lowest level (in this example "level 3") has been reached in the page table hierarchy. If not, as in the present case, control passes to a step 450 at which the retrieved page table entry is used as a base address of a next table in the hierarchy. In the example of the entry retrieved from the level 0 table, the entry acts as a base address of the next level table in the hierarchy, a "level 1 table" 320. Control returns to the step 410.

At the second iteration of the step 410, a further part 322 of the VA 222, being the next 9 bits [38:30] of the VA 222, forms an offset from the base address of the table 320 in order to provide the PA of an entry 324 in the table 320. This then provides the base address of a "level 2 table" 330 which in turn (by the same process) provides the base address of a "level 3 table" 340.

When the level 3 table has been accessed, the answer to the detection at the step 440 is "yes". The page table entry indicated by the PA 344 provides a page address and access permissions relating to a physical memory page. The remaining portion 352 of the VA 222, namely the least significant 12 bits [11:0] provides a page offset within the memory page defined by the page table entry at the PA 344, though in an example system which stores information as successive four byte (for example 32 bit) portions, it may be that the portion [11:2] provides the required offset to the address of the appropriate 32-bit word. For example, this might be implemented by the arrangement providing the byte address of the first byte of the 32-bit word.

Therefore, the combination (at a step 460) of the least significant portion of the VA 222 and the final page table entry (in this case, from the "level 3 table" 340) provides (at a step 470) the PA 232 as a translation of the VA 222.

Terminology to be used in this description is summarised as follows:

translation information includes the page table hierarchy of multiple page table levels;

each page table level provides one or more different "level tables" (also referred to as a "level n table" where n defines the applicable page table level. In some examples there might be one level table at the highest page table level (level 0 in this example) but multiple level tables at lower page table levels each level table contains "entries"

an entry (in all but the lowest or last page table level) provides information to identify a level table at a next page table level, such as a physical table base address within a level table, an entry is selected according to an index or selection value, the selection value being dependent upon a portion or slice, applicable to that page table level, of the relevant input memory address Note that as discussed above, multiple stage MMUs are used in some situations. In this arrangement, two levels of translation are used. A virtual address (VA) required by an executing program or other system module such as a graphics processing unit (GPU) is translated to an intermediate physical address (IPA) by a first MMU stage. The IPA is translated to a physical address (PA) by a second MMU stage. One reason why multiple stage translation is used is for security of information handling when multiple operating systems (OS) may be in use on respective "virtual machines" running on the same processor. A particular OS is exposed to the VA to IPA translation, whereas only a hypervisor (software which oversees the running of the virtual machines) has oversight of the stage 2 (IPA to PA) translation. In a multiple stage MMU, for a VA to IPA translation, the VA may be considered as the input memory address and the IPA as the output memory address. For an IPA to PA translation, the IPA may be considered as the input memory address and the PA as the output memory address.

Figure 6:
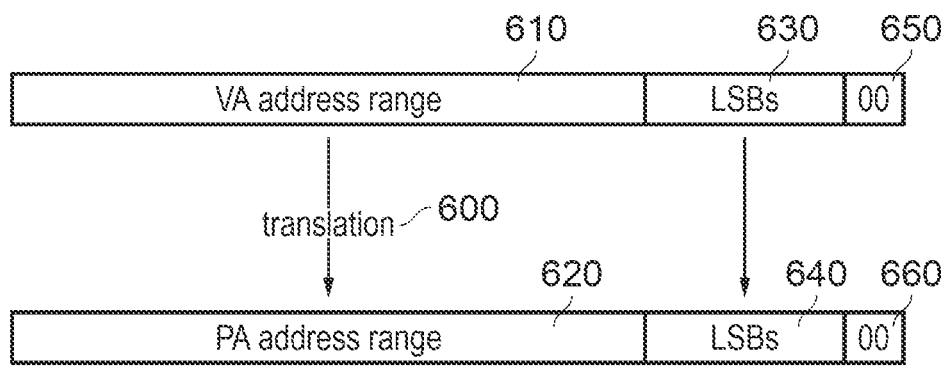
FIG. 6 schematically illustrates an address translation.

FIG. 6 summarises certain aspects of the translation arrangement just described, in that an example translation 600 actually concerns a VA page defined by a set 610 of most significant bits referred to in FIG. 6 as the "VA address range". For example, the VA address range may be defined by all but the least significant 12 bits of the VA, providing a VA page size of 4 kB, though this is of course just an example. A translation 600 is defined as between the VA address range 610 and a PA address range 620, being all except the least significant 12 bits of the translated PA. As mentioned above, the least significant bits 630, or at least bits [11:2] of the VA become the corresponding bits 640 of the PA. Depending on the word size of the system in use, one or more least significant bits may be set to 0 so that each VA and each PA refers to a word boundary. For example, in a system which addresses memory at a 32-bit word granularity, the two least significant bits 650, namely bits [1:0] are tied to 0 in both the VA and (as bits 660) the PA. In other examples, addressing at byte level granularity may be permitted and implemented.

Figure 7:
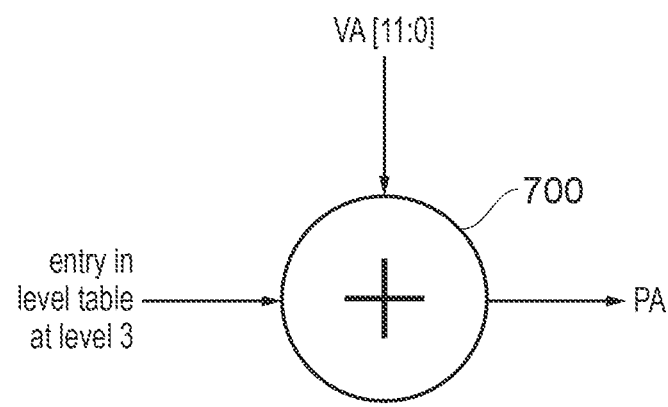
FIG. 7 schematically illustrates generation of an output memory address.

This arrangement may be represented as shown schematically in FIG. 7, and this representation will be used in further diagrams to be discussed below. Here, a schematic adder 700 is shown as having two inputs: one is the LSBs of the VA (or other IMA) such as VA [11:0], and the other is the entry accessed from the relevant level page at level 3 of the page table hierarchy. The sum of the two inputs provides the OMA (in this example case, a PA).

This therefore provides an example in which an entry at a final page table level of the hierarchy of page table levels provides at least a set of most significant bits of the output memory address.

Accessing Stored Level Table Entries

In the context of the previously proposed arrangements as discussed above, accessing a page table entry of a particular level table (other than the last level in the hierarchy) provides a base address of the appropriate level table at a next page table level. A respective portion of the VA provides an index into that next level table to obtain the relevant entry.

Figure 8:
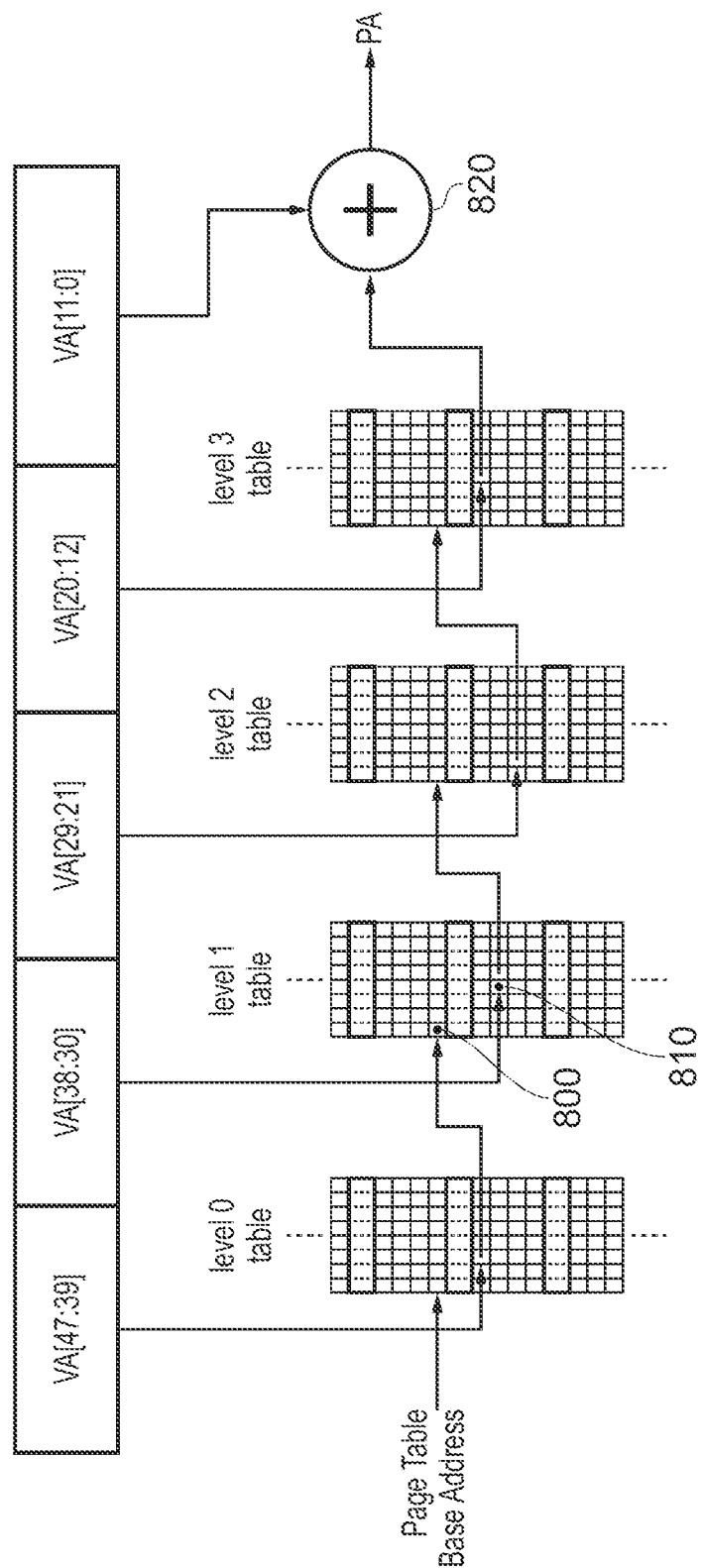
FIG. 8 provides a further schematic representation of an address translation process.

FIG. 8 schematically illustrates an example of this arrangement in which entries are laid out in memory as groups or cache lines of eight entries (in an example in which each entry comprises 8 bytes and cache lines are 64 bytes in length, though of course other permutations of entry size and cache line size could be used). The eight entries of a cache line are drawn as a horizontal row in the representation of FIG. 8. It will be seen that the respective selection value formed from a portion of the VA provides an offset between the base address of the respective table and a particular entry within that level table. Each level table is laid out contiguously in memory, so that adjacent entries in a cache line are from the same level table but correspond to different indices or selection values. So, for example, within the level 1 table of FIG. 8, the portion VA [38:30] provides an address offset between the base address 800 of the level 1 table and a required entry 810. Other entries in the same row as drawn (in other words the same cache line) relates to the same level table but different address offsets, or in other words different values of VA [38:30]. Therefore, any given cache line would be expected to contain eight entries corresponding to 8 different indices (selection values dependent upon the respective slice of the VA) for that level table.

A schematic adder 820 (similar in function to the adder 700 mentioned above) is provided.

The present disclosure notes that the page table walk process discussed above can require multiple dependent (or in other words chained) memory accesses for a single translation to be implemented. During such a page table walk, data cache misses for level table entries can cause the process to stall while the required entries are fetched from main memory. There is therefore an opportunity to use a so-called speculative prefetching process. However, prefetching is generally implemented on a cache line by cache line basis, and the discussion above demonstrates that in the page table layout in memory shown schematically in FIG. 8, any given cache line prefetched into the cache from main memory would contain at most only one entry which may be relevant to the VA slice or selection value appropriate to the level table for which prefetching is being performed.

This type of previously proposed level table layout is summarised schematically in FIG. 9 in which table entries 900 relating to successive indices or selection portions 910 (where an index or selection portion is determined from the relevant slice of the VA or IMA) are stored to memory (shown schematically at the right hand side of FIG. 9) in a logically successive order so that a single cache line such as a cache line 920 may contain eight entries from the same level table but relating to 8 respective different indices or selection portions.

Here the notation "TnEm" relates to the mth entry in the nth level table at a given level. Two example level tables at this level, T0 and T1 are shown.

Page Table Entry Grouping

FIG. 10 schematically illustrates an alternative layout in memory for the level tables of a particular page table level. This technique is applicable to at least a subset of page table levels comprising one or more of the page table levels, such as levels other than the highest level (level 0 in the discussion above).

Here, entries 1000 corresponding to respective indices 1010 are shown in a similar manner to those shown in FIG. 9. Again, the right hand side of FIG. 10 schematically illustrates the layout in memory. In summary, instead of allocating one cache line to store eight successively indexed entries from the same level table, cache lines are instead allocated so that each cache line stores eight entries having the same index but corresponding to different respective level tables at the same page table level. Any given cache line such as a cache line 1020 stores a grouping of entries or corresponding to the same index or selection portion. Note (with relevance to this entire discussion of FIG. 10) that main memory may not necessarily support or provide meaning to the concept of a cache line. In such a case, note that the tables are allocated in main memory so that, when read into the cache, the entries will be laid out this way in the relevant cache line.

Still referring to FIG. 10, the right-hand side of the diagram schematically illustrates a memory region 1030 relating to a given page table level. The memory region is defined by a region base address 1040 aligned to a cache-line sized boundary and occupies a number m of cache lines 1050, where m=$2^{(number\ of\ bits\ in\ relevant\ IMA\ slice)}$ or in other words the number of possible values of the relevant IMA slice. In the examples provided above, each IMA slice used to index into a level table has 9 bits, so the number m of cache lines in the region 1030 is $2^9$ or 512 (the simplified example of FIG. 10 illustrates a number m of cache lines equal to $2^4$ or 16 for clarity of the diagram).

The region 1030 is capable of representing up to 8 level tables at the given page table level. An individual level table occupies a vertical slice through the region as drawn, having one entry in each cache line. So, for example, a first level table is represented by entries 1060, a second level table by entries 1070 and so on.

In respect of the level table represented by entries 1060, the region base 1040 is also the table base for that level table. The address displacement between successive entries in that level table is equal to the cache line size (64 bytes in this example). In effect, the table base 1080 for the level table represented by entries 1070 is higher than the region base 1040 by the size of one entry.

'Due to the pre-defined mapping between main memory addresses and cache lines, access to the region 1030 is performed on a cache line by cache line basis, such that an entire cache line is either retrieved or prefetched into the cache system in response to the region base and the prevailing IMA slice. In order to select a cache line for prefetching, starting from the region base 1040, an offset is added to the region base address such that for an increment of 1 in the IMA slice, the accessed address increases by 64. As discussed below, this offset is obtained by effectively multiplying the IMA slice by 64, which in practical terms is performed by applying a logical shift left (LSL) of 6 bits to the IMA slice. The cache line to be accessed in a prefetch operation is then defined by:

region address 1040+(IMA slice LSL 6)

This calculation is performed by a walk controller or prefetch circuitry to be discussed below.

In FIG. 10, therefore, the memory circuitry is configured to store entries as groups of entries (such as a group or cache line 1020), a group of entries being accessible by a single memory retrieval operation such as a retrieval or prefetch operation; in which, for at least a subset of the page table levels, a group of entries stored by the memory circuitry comprises a set of entries 1065, 1075 from two or more respective level tables 1060, 1070. In the example shown, such a set of entries comprises two or more entries of different respective level tables, the two or more entries being selected by the same selection value (for example, the line 1020 contains entries from up to eight different level tables all selectable by an index or selection value (in the simplified example of the diagram) of 000000001). Although a cache line could in principle contain two or more entries from the same level table, in the examples here the set of entries comprises all of the respective group of entries—or in other words, each entry of the cache line (or group) is from a different respective level table.

Figure 11:
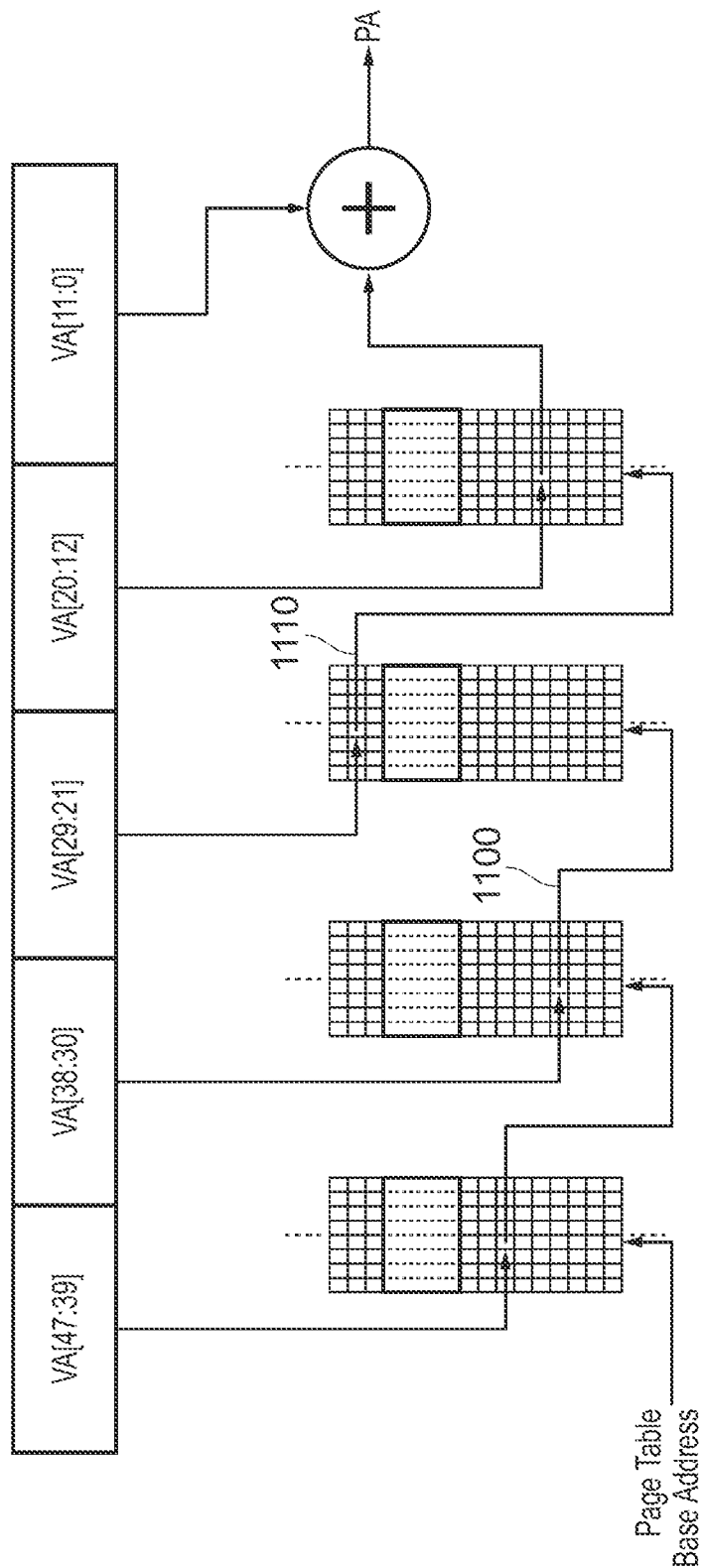
FIG. 11 provides a schematic representation of a further example of an address translation process.

Referring to FIG. 11, in order to access a required entry at a page table level, the relevant VA slice references a set/group of entries mapping to a single cache line (such as a cache line 1100 or a cache line 1110) holding eight entries relevant to that VA slice. The page table base address defines a base address of a vertical slice (as drawn schematically in FIG. 10) and therefore when combined with (IMA slice LSL 6) defines one of those entries within the required cache line. As before, an accessed entry for all but the final page table level provides a page table base address for the next level.

Example Circuitry and Prefetching

Figure 12:
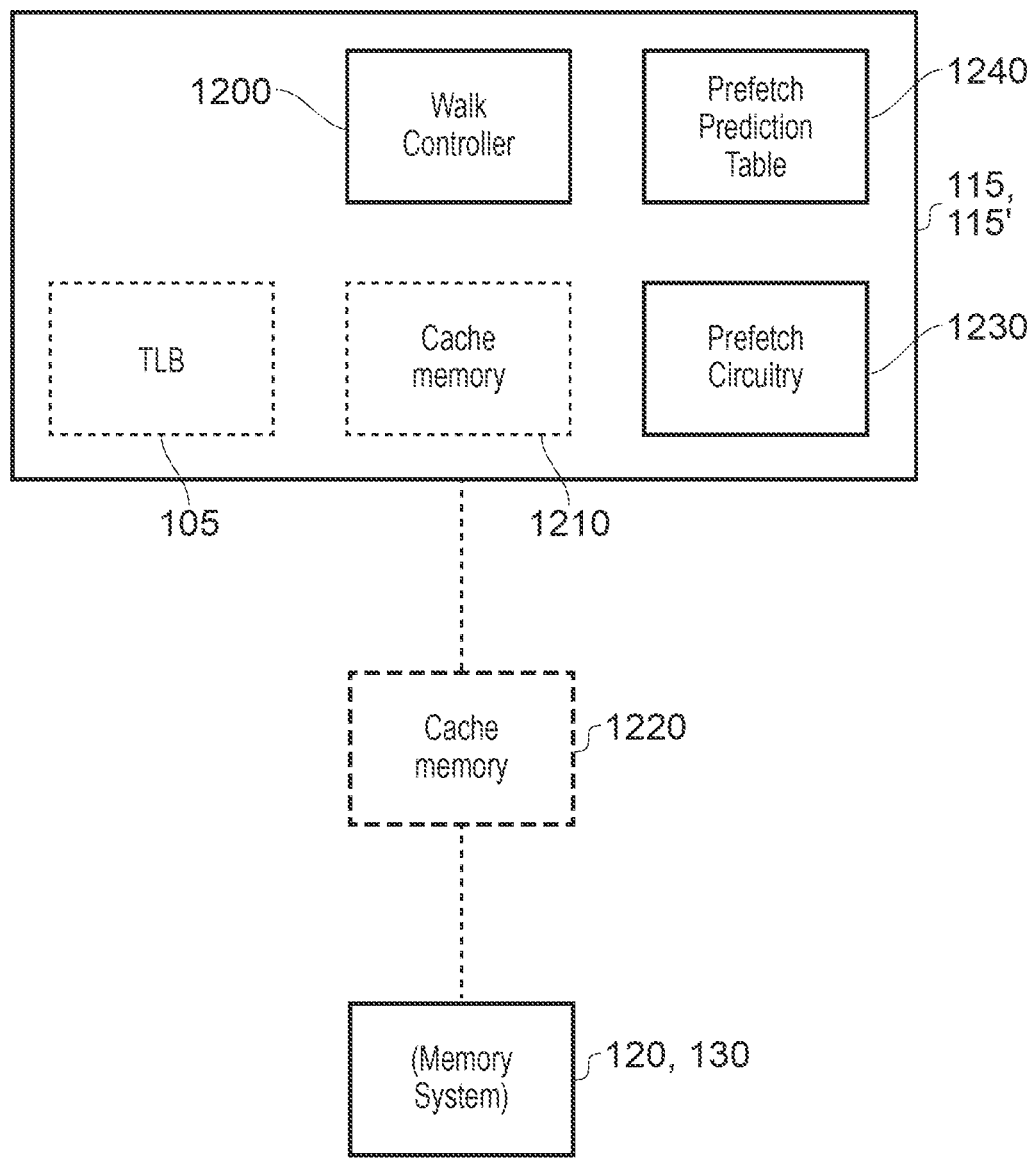
FIG. 12 schematically illustrates example circuitry.

FIG. 12 schematically illustrates the translation apparatus 115 or 115' in more detail.

Note that as discussed above, optionally the MMU 115, 115' may comprise the TLB 105.

In FIG. 12 a walk controller 1200 oversees and schedules the memory accesses required to perform a page table walk in response to receipt of an IMA for translation. The walk controller 1200 can access table entries stored in a cache memory if an appropriate copy is already held in the cache memory. If a copy is being retrieved or prefetched, it is retrieved or prefetched to cache memory from where the walk controller can access it. The cache memory may be provided as part of the translation apparatus 115 (shown schematically as a cache memory 1210 such as a so-called walker cache for use in caching page table data in FIG. 12), as separate circuitry, for example logically disposed between the walk controller 1200 and the memory system 120, 130 (and shown schematically as a cache memory 1220 in FIG. 12), or both. In general, a cache memory system comprising one cache memory or a hierarchy of cache memories can be provided—for example such that the cache memory 1220 (for example a level 3 or level 2 cache memory) may be, for example, larger but slower than the cache memory 1210 (for example a level 2 or level 1 cache memory respectively). The present examples may be applied to any intermediate memory in which page table data may be temporarily stored when retrieved or prefetched from main memory—for example a dedicated prefetch stream buffer or the like.

Either or both of the cache memories 1210, 1220 therefore provide an example in which the circuitry comprises cache memory circuitry to store groups of entries retrieved from the memory circuitry, the memory address translation circuitry being configured to access entries stored by the cache memory circuitry. For example, the cache memory may be configured to store cache lines, each group of entries occupying one cache line. A retrieval or prefetch operation in connection with any entry in a given line can result in that whole line being stored to the cache memory system.

Cache lines containing table entries may be stored in one or both of the cache memories by virtue of having been recently accessed by the walk controller 1200, for example in respect of a previous page table walk operation. Such entries may be maintained in the cache memory system until they are evicted to make space for newly accessed cache lines according to a replacement policy applicable to the cache memory system. As an alternative, however, at least a portion of the cache memory system can be populated speculatively by prefetch circuitry 1230. The prefetch circuitry can operate according to principles to be discussed below in order to aim to speculatively populate cache lines in the cache memory system which may contain table entries that will be required later during a particular page table walk process.

The prefetch circuitry 1230 may be arranged to initiate prefetching of one or more groups of entries from the memory circuitry to the cache memory circuitry.

In examples of the present disclosure, the prefetching process can be made potentially more efficient, or at least potentially more likely to result in a useful table entry being prefetched into the cache memory system, by virtue of the way in which table entries are stored with respect to cache lines in the memory system 120, 130.

The prefetch circuitry 1230 may make use of a prefetch prediction table 1240. Examples of the use of a prefetch prediction table will be discussed below.

FIG. 12 therefore provides an example of circuitry comprising:

memory address translation circuitry (115) to access memory circuitry (120) storing translation information (for example as regions 1030 of FIG. 10) defining memory address translations from input memory addresses to respective output memory addresses;

in which the translation information stored by the memory circuitry comprises a hierarchy of page table levels from a highest page table level to a lowest page table level, each page table level having one or more level tables each comprising two or more entries, in which an entry of a level table at a page table level other than a last page table level of the hierarchy points to a level table at a next lower page table level in the hierarchy;

the memory address translation circuitry being configured to select an entry of a level table at each page table level according to a selection value, the selection value being dependent upon a portion, applicable to that page table level, of a given input memory address;

in which the memory circuitry is configured to store entries as groups of entries (such as a group or cache line 1020), a group of entries being accessible by a single memory retrieval operation;

and in which, for at least a subset of the page table levels, a group of entries stored by the memory circuitry comprises a set of entries from two or more respective level tables.

Such circuitry may also comprise the memory circuitry 120.

In at least some examples, which the memory address translation circuitry is configured to select an entry of a level table at each page table level according to the selection value and a pointer dependent upon an entry selected for a level table at the next higher page table level.

Figure 13:
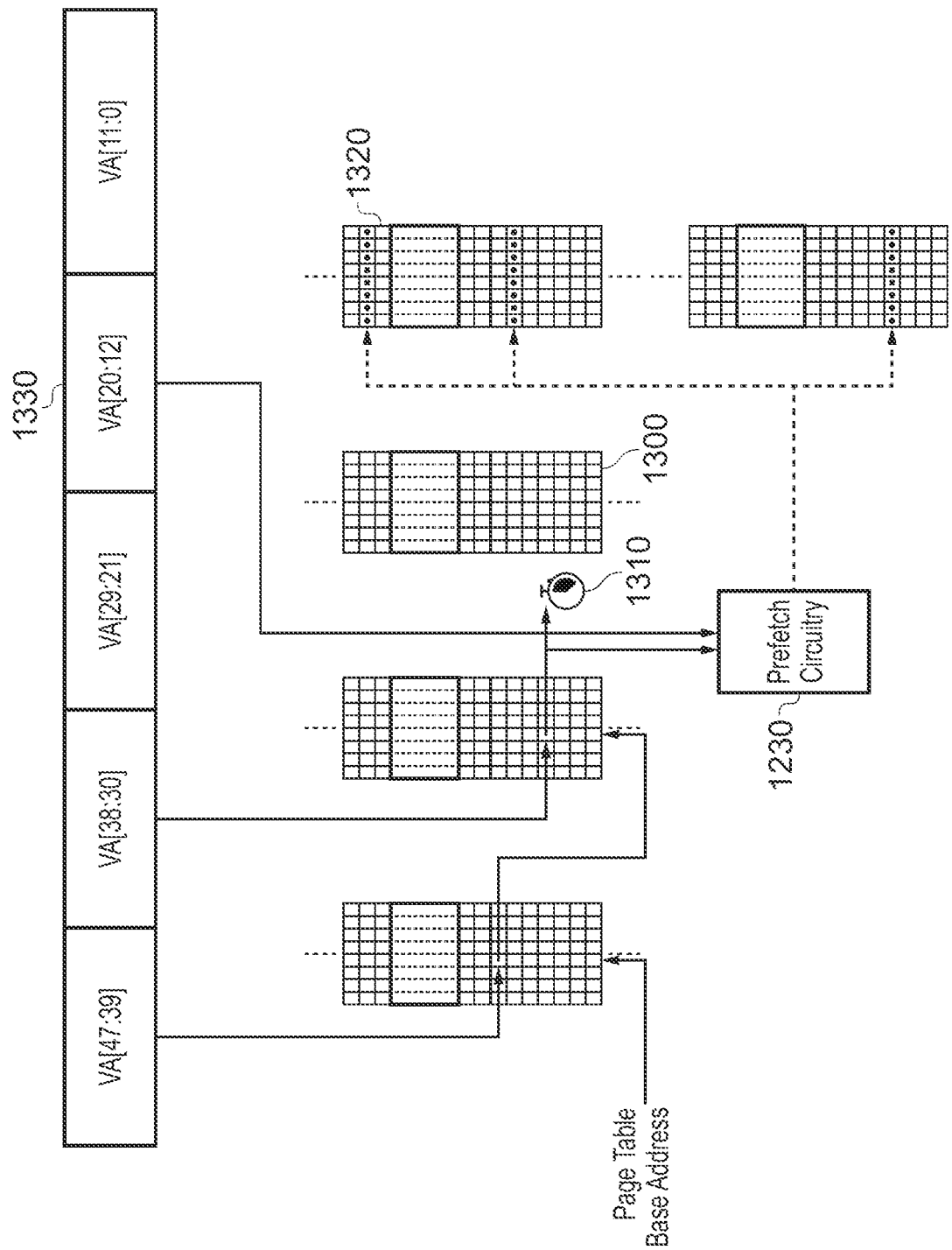
FIG. 13 schematically illustrates a prefetch process.

FIG. 13 provides an illustration of prefetching in the present context. In general terms, FIG. 13 illustrates a part of a page table walk process similar to that shown in FIG. 11. A required entry in the level 2 table 1300 is not present in the cache memory (or, if more than one is provided, any one or more of the cache memories), a situation referred to as a cache miss. In this situation, the walk controller 1200 initiates retrieval of the required entry of the level 2 table 1300 from the memory system 120, 130. In comparison with accessing cache storage, this is potentially a much slower process and so the walk controller is likely to stall while waiting for the entry of the table 1300 to be returned by the memory system. The stall of the walk controller 1200 is illustrated schematically in FIG. 13 by a schematic stopwatch icon 1310.

In this case, however, the prefetch circuitry 1230 can initiate one or more speculative loads for cache lines likely to contain the entry which will be required for the level 3 table 1320. Note that as discussed above, lines of entries in the level 3 table 1320 are pointed to by the respective portion 1330 (VA [20:12] in this example) of the IMA. However, there can be multiple level 3 level tables containing entries which are consistent with the portion 1330 and until the actual entry in the level 2 table 1300 has been retrieved, the system does not know definitively which level 3 level table will contain the correct required entry. However, entries consistent with the portion 1330 from multiple level 3 level tables are grouped together such that, in this example, eight such entries may be retrieved by one prefetch operation for a single cache line. In contrast, in the previously proposed arrangement described earlier, any speculatively loaded line would contain only a single potentially correct entry.

Therefore, in these examples, the prefetch circuitry is configured to initiate prefetching, for a given page table level, of a group of entries including entries selectable by the selection value applicable to the given page table level.

There still remains the question of which cache line(s) to speculatively prefetch, given that there may be multiple memory regions each containing a cache line of entries selectable by the relevant IMA slice.

The portions of the IMA, for example including the portion 1330 shown in FIG. 13, are known at the beginning of the translation process by the prefetch circuitry inspecting relevant slices of the IMA being translated.

As an example of the use of one or more prefetch prediction tables, the walk controller and/or prefetch circuitry could maintain a store or cache of mappings from "level-n table base address" to "likely level (n+1) region address". In other words, the prefetch circuitry can be configured to initiate prefetching, for the given page table level, in response to an entry selected by the memory address translation circuitry for a level table of a page table level higher (for example, next higher) than the given page table level.

Here, the term 'likely' could refer to Most Recently Used (MRU), Most Frequently Used (MFU), or some other appropriate scheme determined by analysis of expected workloads and hardware complexity constraints. The tables are populated on the basis of recently or frequently implemented entry accesses relating to actual page table entries.

For example, tables of the following form could be maintained:

| Level 1 prefetch prediction table | | | | | |
|---|---|---|---|---|---|
| Level 0 entry address | MRU/MFU level 1 region base addresses for prefetch | | | | |
| Addr | Addr | Addr | Addr | Addr | Addr |

| Level 2 prefetch prediction table | | | | | |
|---|---|---|---|---|---|
| Level 1 entry address | MRU/MFU level 2 base address for prefetch | | | | |
| Addr | Addr | Addr | Addr | Addr | Addr |

| Level 3 prefetch prediction table | | | | | |
|---|---|---|---|---|---|
| Level 2 entry address | MRU/MFU level 1 region base address for prefetch | | | | |
| Addr | Addr | Addr | Addr | Addr | Addr |

The tables make use of the feature that in the case of a stall, it is access to a 'level-N table entry address' which has stalled. For each such entry address the tables provide zero or more different sets of level-N+1 predictions for each entry in the level-N table.

Here the prefetch prediction tables are shown as being separated by level. However, it would also be possible to use a single unified table. It would also be possible to harvest the region addresses from a Walker Cache instead of having a dedicated prefetch cache; in this case the predicted region addresses would be generated from the Table Base addresses in the Walker Cache by masking the lower bits which define a particular level table within a region (so that the region address is of the leftmost entry of a cache line as drawn schematically in FIG. 10). This provides an example in which the prefetch circuitry is configured to initiate prefetching in response to one or more addresses of previously accessed page table entries stored by the cache memory circuitry.

If separate tables are used, the number of MRU/MFU entries in each row could be different for each level.

This therefore provides an example in which a prefetch prediction table is provided to store, for one or more of the subset of page table levels, mappings between a pointer into a level table at a higher page table level and prefetch information which, when combined with the selection value applicable to the given page table level, defines at least one prefetch address of a group of entries to be prefetched. In some examples, the prefetch prediction table may be configured to detect a mapping applicable to a page table entry selected by the memory address translation circuitry and to replace a stored mapping with a newly detected mapping according to a replacement policy.

A summary example prefetch process will now be described, with reference to the following portions VAn of the IMA to be translated (in this example, a VA):

| VA0 | VA1 | VA2 | VA3 | VA4 | Offset |
|---|---|---|---|---|---|
| [47:46] | [38:30] | [45:39] | [29:21] | [20:12] | [11:0] |

The VA to be translated is sliced into selection portions or indexes VA0 to VA4.

The walk controller takes the Translation Table Base Address, for example from a translation table base address processor register, adds (VA0 LSL 6) to get the address of the Level 0 table entry, and issues a fetch. As indicated above, "LSL n" represents a logical shift left by n bit positions.

If this fetch results in a cache miss, the prefetch circuitry can then begin to issue prefetches while the walk controller is waiting. First (in this example) the prefetch circuitry will examine the Level 1 prefetch table to see whether there is an entry for the Level 0 table entry address being waited on. If so, prefetches against some or all the likely Level 1 table lines can be issued by taking the stored region Base Addresses and adding (VA1 LSL 6).

Optionally, the prefetch circuitry can then also issue prefetches for some or all the likely level 2 table lines by looking for any entries in the Level 2 prefetch Table that correspond to the Level 1 lines that were prefetched. This process can be repeated for all levels of the prefetch Tables, depending on the amount of prefetching required, and the complexity of the hardware. (The number of prefetches issued will be exponential if a full traversal of the prefetch Tables is performed, so some culling, for example by limiting to a maximum number of concurrent prefetch operations, may be performed). This therefore provides an example in which the prefetch circuitry is configured to initiate prefetching, for the given page table level, in response to an entry prefetched for a page table level higher (for example, next higher) than the given page table level.

When the real Level 0 table entry requested from memory is finally returned, the real address of the next level entry can be determined. If the prefetching has been successful, this entry will already have been prefetched into the cache, or will be due to arrive in the cache a few cycles later.

The prefetch tables can then be updated according to the chosen replacement policy. Prefetching and updates of the prefetch Tables are off the critical path for translation.

A cache miss at any stage of the page table walk can be used to initiate a new round of pre-fetches. Outstanding prefetches relating to a page table level can be cancelled when true data has been returned for that level.

Population of translation information Population of the translation information can be performed, for example, by an OS or hypervisor running on the (or a) PE 100, thus providing an example in which the circuitry comprises a processor to execute a control program to define mappings between input memory addresses and output memory addresses and to populate the translation information stored by the memory in dependence upon the mappings.

The translation information layout in memory described here can co-exist with previously proposed packed translation tables. Access to lines containing groups of similarly indexed entries differs from access to previously proposed page tables by different shifts and masking of table indexes and addresses, and can therefore be controlled by a system register. If that system register defaults to "previously proposed packed table" at power on or reset, an OS that is unaware of the presently described scheme can operate correctly. Likewise, translation table walk prefetching may be controlled by a system register and default to 'off'.

The presently described scheme can be implemented by using the OS to allocate a large page to act as a location to hold the page table information. However, many regions will fit into a single large page, so this requirement is unlikely to be onerous. The OS would allocate new page table levels incrementally (as would be the case for traditional page table levels). A new empty memory region of the type illustrated as an example region 1030 in FIG. 10 would be reserved, and eight tables would then be allocated into the memory region as IMA address space is allocated to the process. The reserved region is (in this example) 64 bytes* $2^{(number\ of\ bits\ in\ relevant\ IMA\ slice)}$ in size.

The table base address for the populated level tables have table bases equal to:

region base+p×8 bytes where p is between 0 and 7 and is incremented as and when each further level table is to be populated.

In the case that a ninth or further table is to be populated at that level, the OS simply allocates a further region after each set of eight level tables has been populated, and populates the further level tables within that region.

In some examples, it is possible for tables at different page table levels to be populated differently. The discussion above referred to these techniques being used for at least a subset of the page table levels. In some examples, the term "at least a subset" may refer to all page table levels. However, in other examples, the term "at least a subset" may refer to fewer than all of the page table levels. For example, a previously proposed layout in memory (FIG. 9 for example) may be used for other levels apart from such a subset.

In some examples, the subset of page table levels comprises one or more page table levels other than a final or lowest page table level.

In some examples, the subset of page table levels comprises one or more page table levels other than a first or highest page table level. For example, prefetching may be used more sparingly or less often for the highest page table level, so that the potential advantages relating to efficient prefetching may be less significant at the highest page table level.

Therefore, in some examples the region based table population discussed above may be applicable to all but the highest and lowest page table levels.

Example Method

Figure 14:
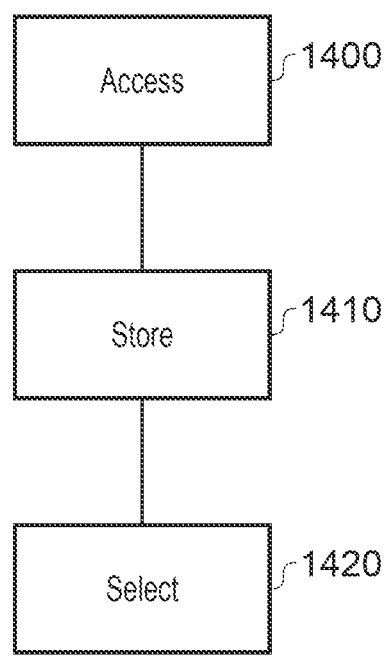
FIG. 14 is a schematic flowchart illustrating a method.

FIG. 14 schematically illustrates an example method comprising:
  accessing (at a step 1400) translation information defining memory address translations from input memory addresses to respective output memory addresses;
  in which the translation information comprises a hierarchy of page table levels from a highest page table level to a lowest page table level, each page table level having one or more level tables each comprising two or more entries, in which an entry of a level table at a page table level other than a last page table level of the hierarchy points to a level table at a next lower page table level in the hierarchy;
  storing (at a step 1410) entries as groups of entries, a group of entries being accessible by a single memory retrieval operation, in which, for at least a subset of the page table levels, a group of entries stored by the memory circuitry comprises a set of entries from two or more respective level tables; and
  selecting (at a step 1420) an entry of a level table at each page table level by a selection value, the selection value being dependent upon a portion, applicable to that page table level, of a given input memory address.

Example Embodiments

Respective example embodiments are defined by the following numbered clauses:
1. Circuitry comprising:
  memory address translation circuitry to access memory circuitry storing translation information defining memory address translations from input memory addresses to respective output memory addresses;
  in which the translation information stored by the memory circuitry comprises a hierarchy of page table levels from a highest page table level to a lowest page table level, each page table level having one or more level tables each comprising two or more entries, in which an entry of a level table at a page table level other than a last page table level of the hierarchy points to a level table at a next lower page table level in the hierarchy;
  the memory address translation circuitry being configured to select an entry of a level table at each page table level according to a selection value, the selection value being dependent upon a portion, applicable to that page table level, of a given input memory address;
  in which the memory circuitry is configured to store entries as groups of entries, a group of entries being accessible by a single memory retrieval operation;
  and in which, for at least a subset of the page table levels, a group of entries stored by the memory circuitry comprises a set of entries from two or more respective level tables.
2. The circuitry of clause 1, in which the set of entries comprises two or more entries of different respective level tables, the two or more entries being selected by the same selection value.

3. The circuitry of clause 2, in which the set of entries comprises all of the respective group of entries.

4. The circuitry of any one of the preceding clauses, comprising cache memory circuitry to store groups of entries retrieved from the memory circuitry, the memory address translation circuitry being configured to access entries stored by the cache memory circuitry.

5. The circuitry of clause 4, in which the cache memory is configured to store cache lines, each group of entries occupying one cache line.

6. The circuitry of clause 4 or clause 5, comprising prefetch circuitry to initiate prefetching of one or more groups of entries from the memory circuitry to the cache memory circuitry.

7. The circuitry of clause 6, in which the prefetch circuitry is configured to initiate prefetching, for a given page table level, of a group of entries including entries selectable by the selection value applicable to the given page table level.

8. The circuitry of clause 6 or clause 7, in which the prefetch circuitry is configured to initiate prefetching, for the given page table level, in response to an entry selected by the memory address translation circuitry from a level table of a page table level higher than the given page table level.

9. The circuitry of clause 7 or clause 8, in which the prefetch circuitry is configured to initiate prefetching, for the given page table level, in response to an entry prefetched for a page table level higher than the given page table level.

10. The circuitry of any one of the preceding clauses, in which the memory address translation circuitry is configured to select an entry of a level table at each page table level according to the selection value and a pointer dependent upon an entry selected for a level table at the next higher page table level.

11. The circuitry of any one of clauses 7 to 9, comprising a prefetch prediction table to store, for one or more of the subset of page table levels, mappings between a pointer into a level table at a higher page table level and prefetch information which, when combined with the selection value applicable to the given page table level, defines at least one prefetch address of a group of entries to be prefetched.

12. The circuitry of clause 11, in which the prefetch prediction table is configured to detect a mapping applicable to a page table entry selected by the memory address translation circuitry and to replace a stored mapping with a newly detected mapping according to a replacement policy.

13. The circuitry of clause 6 or any one of clauses 7 to 12 as dependent upon clause 6, in which the prefetch circuitry is configured to initiate prefetching in response to one or more addresses of previously accessed page table entries stored by the cache memory circuitry.

14. The circuitry of any one of the preceding clauses, comprising a processor to execute a control program to define mappings between input memory addresses and output memory addresses and to populate the translation information stored by the memory in dependence upon the mappings.

15. The circuitry of any one of the preceding clauses, comprising the memory circuitry.

16. The circuitry of any one of the preceding clauses, in which:
   (i) the input memory addresses are virtual addresses and the output memory addresses are physical memory addresses; or
   (ii) the input memory addresses are virtual addresses and the output memory addresses are intermediate physical memory addresses; or
   (iii) the input memory addresses are intermediate physical memory addresses and the output memory addresses are physical memory addresses.

17. The circuitry of any one of the preceding clauses, in which an entry at a final page table level of the hierarchy of page table levels provides at least a set of most significant bits of the output memory address.

18. The circuitry of any one of the preceding clauses, in which the subset of page table levels comprises one or more page table levels other than a final page table level.

19. The circuitry of clause 18, in which the subset of page table levels comprises one or more page table levels other than a first page table level.

20. A method comprising:
   accessing translation information defining memory address translations from input memory addresses to respective output memory addresses;
   in which the translation information comprises a hierarchy of page table levels from a highest page table level to a lowest page table level, each page table level having one or more level tables each comprising two or more entries, in which an entry of a level table at a page table level other than a last page table level of the hierarchy points to a level table at a next lower page table level in the hierarchy;
   storing entries as groups of entries, a group of entries being accessible by a single memory retrieval operation, in which, for at least a subset of the page table levels, a group of entries stored by the memory circuitry comprises a set of entries from two or more respective level tables; and
   selecting an entry of a level table at each page table level by a selection value, the selection value being dependent upon a portion, applicable to that page table level, of a given input memory address.

General Matters

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the present techniques have been described in detail herein with reference to the accompanying drawings, it is to be understood that the present techniques are not limited to those precise embodiments, and that various changes, additions and modifications can be effected therein by one skilled in the art without departing from the scope and spirit of the techniques as defined by the appended claims. For example, various combinations of the features of the dependent claims could be made with the features of the independent claims without departing from the scope of the present techniques.

The invention claimed is:
1. Circuitry comprising:
   memory address translation circuitry to access memory circuitry storing translation information defining memory address translations from input memory addresses to respective output memory addresses;

in which the translation information stored by the memory circuitry comprises a hierarchy of page table levels from a highest page table level to a lowest page table level, each page table level having one or more level tables each comprising two or more entries, in which an entry of a level table at a page table level other than a last page table level of the hierarchy points to a level table at a next lower page table level in the hierarchy;

the memory address translation circuitry being configured to select an entry of a level table at each page table level according to a selection value, the selection value being dependent upon a portion, applicable to that page table level, of a given input memory address;

in which the memory circuitry is configured to store entries as groups of entries, a group of entries being accessible by a single memory retrieval operation;

and in which, for at least a subset of the page table levels, a group of entries stored by the memory circuitry comprises a set of entries from two or more respective level tables.

2. The circuitry of claim 1, in which the set of entries comprises two or more entries of different respective level tables, the two or more entries being selected by the same selection value.

3. The circuitry of claim 2, in which the set of entries comprises all of the respective group of entries.

4. The circuitry of claim 1, comprising cache memory circuitry to store groups of entries retrieved from the memory circuitry, the memory address translation circuitry being configured to access entries stored by the cache memory circuitry.

5. The circuitry of claim 4, in which the cache memory is configured to store cache lines, each group of entries occupying one cache line.

6. The circuitry of claim 4, comprising prefetch circuitry to initiate prefetching of one or more groups of entries from the memory circuitry to the cache memory circuitry.

7. The circuitry of claim 6, in which the prefetch circuitry is configured to initiate prefetching, for a given page table level, of a group of entries including entries selectable by the selection value applicable to the given page table level.

8. The circuitry of claim 7, in which the prefetch circuitry is configured to initiate prefetching, for the given page table level, in response to an entry selected by the memory address translation circuitry from a level table of a page table level higher than the given page table level.

9. The circuitry of claim 7, in which the prefetch circuitry is configured to initiate prefetching, for the given page table level, in response to an entry prefetched for a page table level higher than the given page table level.

10. The circuitry of claim 1, in which the memory address translation circuitry is configured to select an entry of a level table at each page table level according to the selection value and a pointer dependent upon an entry selected for a level table at the next higher page table level.

11. The circuitry of claim 7, comprising a prefetch prediction table to store, for one or more of the subset of page table levels, mappings between a pointer into a level table at a higher page table level and prefetch information which, when combined with the selection value applicable to the given page table level, defines at least one prefetch address of a group of entries to be prefetched.

12. The circuitry of claim 11, in which the prefetch prediction table is configured to detect a mapping applicable to a page table entry selected by the memory address translation circuitry and to replace a stored mapping with a newly detected mapping according to a replacement policy.

13. The circuitry of claim 6, in which the prefetch circuitry is configured to initiate prefetching in response to one or more addresses of previously accessed page table entries stored by the cache memory circuitry.

14. The circuitry of claim 1, comprising a processor to execute a control program to define mappings between input memory addresses and output memory addresses and to populate the translation information stored by the memory in dependence upon the mappings.

15. The circuitry of claim 14, comprising the memory circuitry.

16. The circuitry of claim 1, in which:
(i) the input memory addresses are virtual addresses and the output memory addresses are physical memory addresses; or
(ii) the input memory addresses are virtual addresses and the output memory addresses are intermediate physical memory addresses; or
(iii) the input memory addresses are intermediate physical memory addresses and the output memory addresses are physical memory addresses.

17. The circuitry of claim 1, in which an entry at a final page table level of the hierarchy of page table levels provides at least a set of most significant bits of the output memory address.

18. The circuitry of claim 1, in which the subset of page table levels comprises one or more page table levels other than a final page table level.

19. The circuitry of claim 18, in which the subset of page table levels comprises one or more page table levels other than a first page table level.

20. A method comprising:
accessing translation information defining memory address translations from input memory addresses to respective output memory addresses;
in which the translation information comprises a hierarchy of page table levels from a highest page table level to a lowest page table level, each page table level having one or more level tables each comprising two or more entries, in which an entry of a level table at a page table level other than a last page table level of the hierarchy points to a level table at a next lower page table level in the hierarchy;
storing entries as groups of entries, a group of entries being accessible by a single memory retrieval operation, in which, for at least a subset of the page table levels, a group of entries stored by the memory circuitry comprises a set of entries from two or more respective level tables; and
selecting an entry of a level table at each page table level by a selection value, the selection value being dependent upon a portion, applicable to that page table level, of a given input memory address.

* * * * *